April 7, 1936. T. TOMLINSON 2,036,556
HEATING AND COOLING SYSTEM FOR AUTOMOBILES
Filed Nov. 10, 1931 2 Sheets-Sheet 1
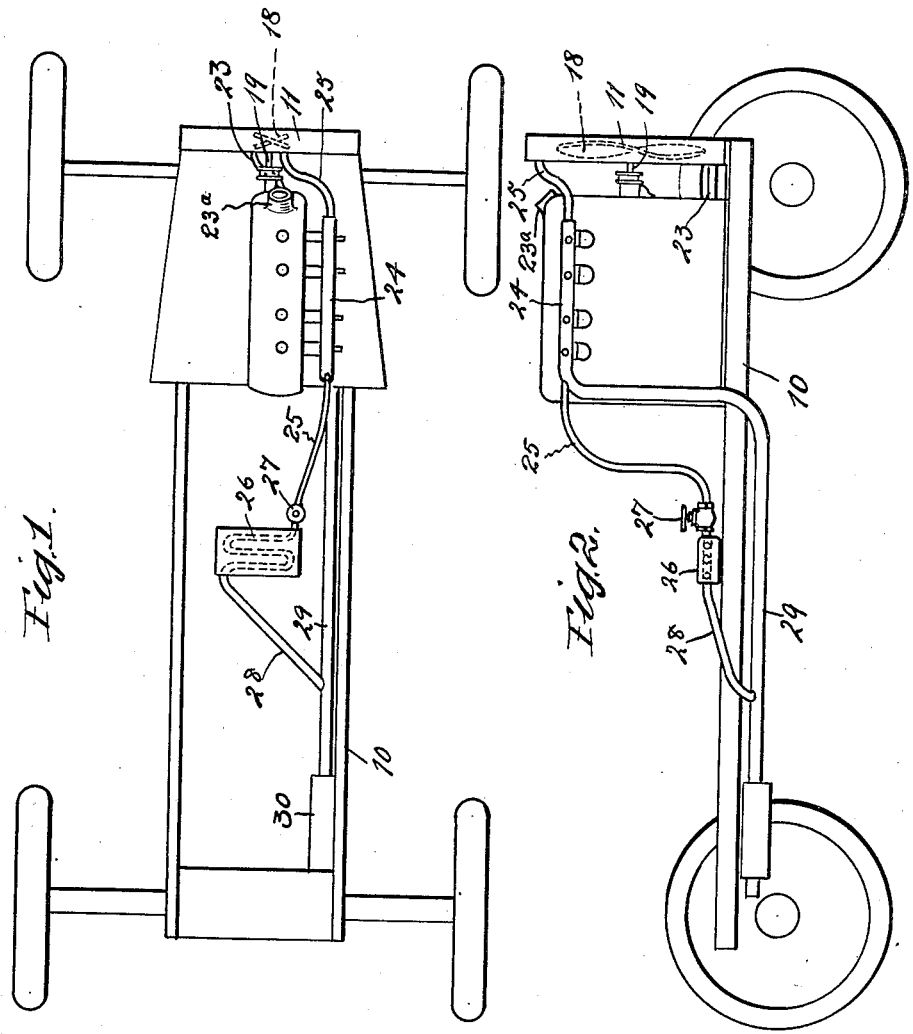
Inventor
Thomas Tomlinson
By
Atty.

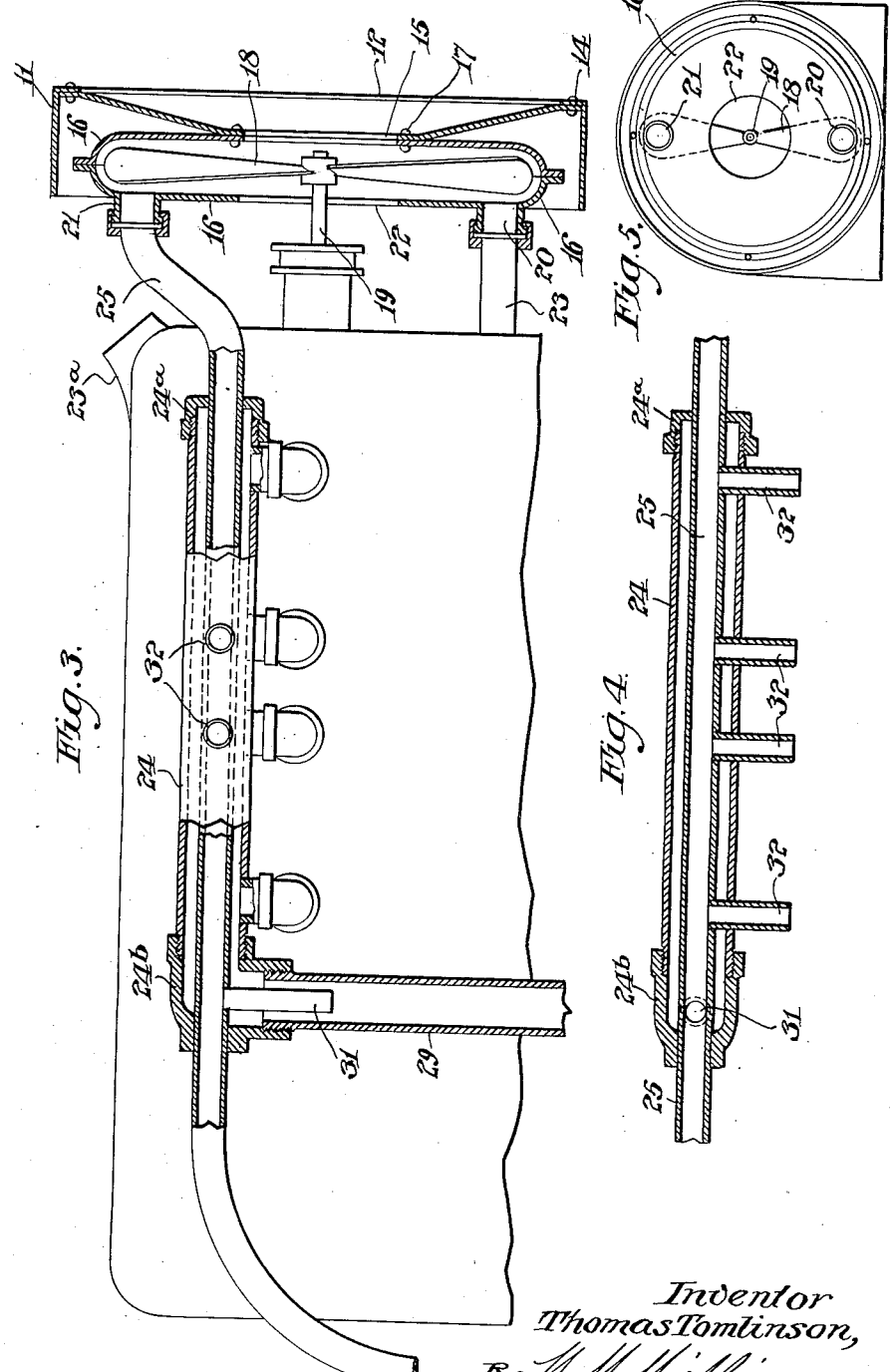

Patented Apr. 7, 1936

2,036,556

UNITED STATES PATENT OFFICE 2,036,556

HEATING AND COOLING SYSTEM FOR AUTOMOBILES

Thomas Tomlinson, North Wildwood, N. J.

Application November 10, 1931, Serial No. 574,129

3 Claims. (Cl. 60—30)

My invention relates to new and useful improvements in a heating and cooling system for automobiles and the like, and has for one of its objects to provide an exceedingly simple and effective apparatus which provides for delivering a vigorous supply of air to what is known as the water jacket of the engine, so as to cool and keep the engine at proper temperature when functioning, and also to provide for the forcing of air into the exhaust pipe of the engine for diluting and consequently reducing the poisonous effect of the products of combustion, so that when the latter issue into the atmosphere, they will be harmless.

A further object of the invention is to provide for the delivery of heated air to a heater within the body of the car for heating the interior of the latter and then conveying this air from the heater to the rear portion of the exhaust pipe.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a plan view of the outline of the running gear of an automobile of the Ford type, the hood being omitted to expose the engine to view.

Fig. 2 is a side elevation of Fig. 1.

Fig. 3 is an enlarged fragmentary side view of the engine with the elements of the invention shown partly in elevation and partly in section.

Fig. 4 is a longitudinal sectional view of the exhaust manifold and air supply pipe illustrated in Fig. 3, the ends of said air supply pipe being broken away.

Fig. 5 is a rear view of the blower casing and the frame in which the latter is mounted.

In carrying out my invention as herein embodied, 10 represents a chassis of an automobile upon the front end of which is mounted and secured a frame 11 which is preferably in the general shape of the radiator of a typical automobile, the rear of which frame is open, while the front wall thereof has a circular opening 12 formed therein.

13 represents a funnel which is secured by the bolts 14 immediately back of the opening 12 and this funnel has the air intake 15 formed through the center thereof in order that the travel of the automobile will deflect a relatively large volume of air toward and through this opening 15.

16 represents a blower casing which is secured to the rear of the funnel 13 by the bolts or rivets 17, and this casing has an air intake opening corresponding in size with the opening 15 and coinciding with the same in position.

Within the casing 16 is located a blower fan 18 mounted and secured to the outer end of the usual fan shaft 19, thus when the engine is running this fan revolves in such a manner as to draw air in from the funnel through the intake openings and force said air through the outlets 20 and 21, said outlets being formed in the rear wall of the blower casing near the periphery of the latter as clearly shown in Figs. 3 and 5. In this rear wall of the blower casing is also formed a relatively large central opening 22 so that the action of the fan will blow a considerable amount of air through this opening against the front of the engine to assist in keeping the temperature of the engine at the proper degree.

23 represents a pipe leading from the outlet 20 through the casing of the engine into the interior of what is known as the water jacket, so that air driven into this pipe will be forced through the interior of the water jacket of the engine and finally escape to the atmosphere through the outlet 23ª provided in such water jacket for the outflow of the water used in cooling the engine.

By this arrangement, the cylinders and various parts of the engine will be kept at the proper temperature, since the air circulating through the interior of the water jacket being expelled to the atmosphere carries off the heat instead of retaining the same as in the case of water cooled engines necessitating radiators to extract the heat from the returning water.

24 represents the exhaust manifold of the engine and through this manifold runs the air delivery pipe 25, the front end of the latter communicating with and leading from the outlet 21 in the blower casing. This air delivery pipe 25 extends rearward from the manifold and is coupled to any conventional form of heater 26 located in the body of the car for heating the interior thereof, and to control the flow of air through this pipe I provide a valve 27 at a point in the pipe just before it enters the heater.

A pipe 28 leads from the heater and is connected with the rear portion of the exhaust pipe 29, said exhaust pipe leading from the exhaust manifold 24.

Preferably the exhaust manifold 24 is a tube with a reducing fitting 24ª on the forward end having a hole the size of the exterior circumference of the air delivery pipe 25, and this hole is in the axial center of the exhaust manifold. On the other or rear end of the exhaust manifold is a reducing T fitting 24ᵇ, two legs of the T fitting being substantially the same size for connection with said manifold and the exhaust pipe 29. The remaining leg of the T fitting is the same size as the exterior circumference of the air delivery pipe and is located axially of the exhaust manifold.

By this arrangement, the air passing through the delivery pipe 25 will be heated by the products of combustion discharged into the exhaust manifold 24 and this air so heated will be forced rearward through the heater 26 and finally through the pipe 28 into the exhaust pipe 29, diluting the products of combustion before they escape from the exhaust pipe to the muffler 30, thereby rendering these products of combustion less harmful than when they are discharged into the open atmosphere and lessening the liability of asphyxiating persons in closed garages.

In order that when the heater is not in use, diluting air may be forced into the exhaust pipe, I provide a branch pipe 31 which opens from the supply pipe 25 to the interior of the exhaust pipe as clearly shown in Fig. 3. This permits the proper volume of air to flow from the air supply pipe directly into the exhaust pipe whether the valve 27 is open or closed, as will be readily understood. In the operation of this system it is desirable that a surplus quantity of air be delivered to the supply pipe in order that there may be at no time a shortage in supply of air to the heater or to the exhaust pipe diluting the products of combustion, while at the same time, it is essential that undue pressure may not be created in the exhaust pipe and therefore I provide the relief outlet pipes 32 which communicate with the interior of the air supply pipe 25, the outer ends communicating with the atmosphere. These relief pipes 32 are secured to a wall of the air delivery pipe 25 and project through holes in a side of the exhaust manifold 24 and the joints sealed.

From the foregoing description, it will be seen that an exceedingly cheap, simple and effective apparatus is provided for converting a water cooled into an air cooled engine, since the only change necessary is the mounting of a blower fan on the outer end of the engine shaft, housing said fan in an inexpensive casing and leading air under fan pressure from the fan to the inlet of the water jacket of the engine, and it is also to be noted that this same fan and casing is utilized for heating the interior of the body of the car and also diluting the products of combustion from the engine before they are discharged into the atmosphere. The simplicity of this apparatus adapts it for new construction of automobiles of any design and also permits its being utilized as an attachment to machines already built.

While this apparatus is especially designed for motor cars, it is also well adapted for airplane service, marine and other internal combustion engines, therefore, I do not wish to be limited to the exact details of construction as herein shown, as these may be varied within the limits of the appended claims without departing from the spirit of my invention.

Having thus fully described my invention, what I claim as new and useful is:—

1. In an automobile engine, an exhaust manifold, an exhaust pipe extending from the inner end of said manifold, a delivery pipe extending through the exhaust manifold of the automobile engine, means for forcing air through said delivery pipe, a branch pipe leading from the delivery pipe and opening into the exhaust pipe, and relief pipes leading from the delivery pipe from points inside of the exhaust manifold, said relief pipes extending through the wall of the manifold and having their outer ends open to the atmosphere whereby any excess air supplied to the delivery pipe may escape.

2. In an automobile engine, the combination of the exhaust manifold of the engine, an air delivery pipe through which air is adapted to pass extending longitudinally through said exhaust manifold whereby the ends of said air delivery pipe project outside of the exhaust manifold, a branch pipe leading from the air delivery pipe into the outlet end of said exhaust manifold, and relief pipes leading from said air delivery pipe at spaced locations and extending through a wall of said exhaust manifold thereby providing a plurality of outlets from the air delivery pipe intermediate the ends thereof through the exhaust manifold.

3. The combination with an internal combustion engine, of a tubular exhaust manifold connected with said engine, a reducing fitting mounted on one end of said manifold with the small hole axially of the manifold, a reducing T fitting mounted on the other end of said manifold through the medium of one of its larger legs with the smaller leg located axially of the exhaust manifold, an air delivery pipe for the passage of air located axially within the exhaust manifold and the ends of said air delivery pipe projecting through the fittings for connection to other structures, a branch pipe leading from the air delivery pipe and projecting into the other larger leg of the T fitting, and a plurality of relief pipes leading from said air delivery pipe at longitudinally spaced location along the latter and projecting through a wall of the exhaust manifold.

THOMAS TOMLINSON.